United States Patent Office 3,244,515
Patented Apr. 5, 1966

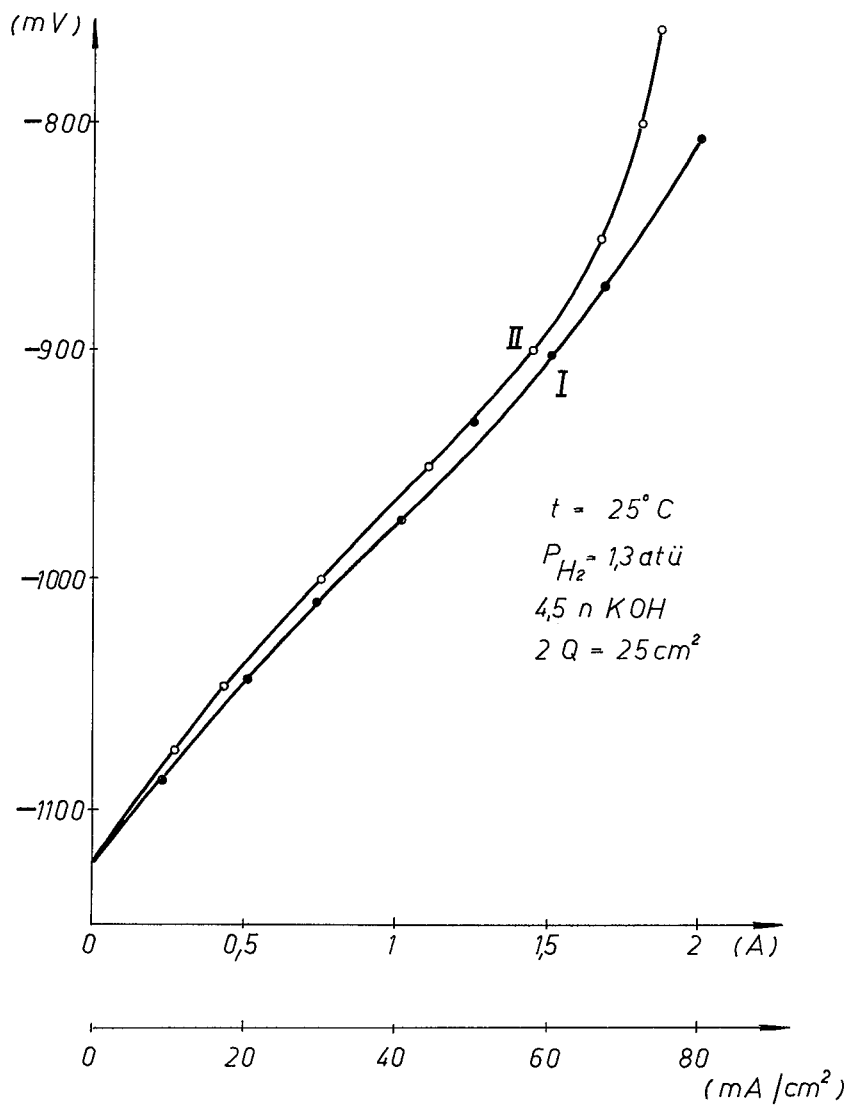

3,244,515
PROCESS FOR THE PRODUCTION OF MULTIPLE LAYER GAS DIFFUSION ELECTRODES
Horst Grüne, Eduard Justi, and August Winsel, Braunschweig, Germany, assignors to Varta Aktiengesellschaft, Hagen, Westphalia, and Siemens-Schuckertwerke A.G., Berlin and Erlangen, Germany
Filed June 19, 1962, Ser. No. 207,139
Claims priority, application Germany, June 21, 1961, R 30,583
8 Claims. (Cl. 75—208)

The present invention relates to a process for the production of multiple layer gas diffusion electrodes, and more particularly to such a process in which at least two abutting initially discrete metal powder layers are pressed and sintered, at least one of the layers initially being in the form of a solid heat-labile temporary thin flat structure.

Porous gas diffusion electrodes are known and such electrodes are used for electro-chemical conversion of reducible or oxidizable gases in electro-chemical cells. Such gas diffusion electrodes are usually formed as circular or rectangular plates or discs and arranged as a partition wall between two cell spaces of the electro-chemical device, one of such spaces containing the electrolyte and the counter electrode while the other space contains the reaction gas, such as a fuel gas or an oxidizing gas, as the case may be. Under the influence of the capillary pressure in accordance with the equation: $p_k = 2\sigma/r$, the wetting electrolyte penetrates into the pores of the electrode. In the foregoing equation, $r$ designates the radius of the pores of the electrode and $\sigma$ designates the surface tension of the electrolyte. In order to form a three-phase interface of electrode/electrolyte/gas which is an indispensable requirement for efficient electro-chemical conversion of the reaction gas, such gas must be supplied to the electrode under a pressure sufficient to overcome the capillary pressure $p_k$ of the electrolyte in the electrode pores. Generally, the pores of the electrode, however, possess radii of varying sizes, such that the desired equilibrium between the capillary pressure and the gas pressure exists only in some of the pores. Accordingly, those pores which are too narrow become filled completely with the electrolyte while those pores which are too large permit the gas to escape therethrough in the form of bubbles into the electrolyte. The former instance results in a loss of effective electrode surface for the desired reaction to take place while the latter instance results in the loss of gas.

Attempts have been made to overcome these drawbacks of known gas diffusion electrodes by providing an electrode having a coarse-pored catalytically active working layer on the side of the electrode body facing the gas and a fine-pored surface layer on the side of the electrode facing the electrolyte. The gas pressure is selected such that the electrolyte may penetrate into the fine pores of the surface layer but not into the large or coarse pores of the working layer. In these electrodes, the three-phase interface occurs at the zone of contact between the two porous layers. Since the electro-chemical conversion of the gas is effected, for the most part, only at the three-phase interface, the flow paths of electrolyte must penetrate the entire surface layer, but this, in turn, results in an increase of the electrode resistance. The production of electrodes of the foregoing type is covered in co-pending U.S. application Serial No. 826,812, filed July 13, 1959. Nevertheless, in order to maintain the electrode resistance as low as possible, the surface layers of the electrode should be relatively thin, i.e. in the order of a few tenths of a millimeter in thickness. However, this requirement renders the production of electrodes of the foregoing type extremely difficult to carry out.

In co-pending U.S. application, Serial No. 208,153 filed Apr. 26, 1962, entitled "Multiple Layer Electrode," and representing an invention of the instant inventors and another, the preparation of multiple gas diffusion electrodes of a particular kind is disclosed wherein the metallic powder materials used for preparing the individual electrode layers are introduced into the mold in an ordinal sequence corresponding to the order of the layers in the electrode to be prepared. The powder material for each layer is pressed and flattened into place before the powder material for the next layer is added to the mold. The mold is then impressed by a stamping member, and the pressed electrode body formed by such compression molding is then made rigid by subsequent sintering. Of course, it is also possible to prepare the electrode body in a single operation by the hot pressing technique, i.e. compression molding at elevated temperatures, as is disclosed in co-pending U.S. application Serial No. 795,559, filed Feb. 25, 1959, now U.S. Patent 3,073,697.

In any case, care must be taken that the powder material for each layer is evenly distributed when the same is introduced into the mold, since irregular pores having widely varying radii will result in the finished electrode body if the material for the respective layers introduced into the mold is not evenly distributed. The presence of foreign bodies in the mold will also lead to undesirable pore formation, and therefore the presence of such bodies should be excluded. As aforesaid, the presence of even a few over-sized pores will allow the passage through the electrode of portions of the supplied gas, whereby such gas will be wasted without the recovery of any electro-chemical energy therefrom. Such loss of gas represents a considerable decrease in the current yield possible with such electrodes, and accordingly electrodes having over-sized pores must be discarded, thus rendering the over-all production of porous electrodes extremely uneconomical. On the other hand, if such electrodes are used, the loss of gas bubbling into the electrolyte through the over-sized pores will cause the operation to be inefficient and in turn uneconomical as well.

The main difficulty with the production of multiple layer gas diffusion electrodes of the foregoing type is the fact that the surface layers and working layers of the electrode cannot be formed separately and thereafter pressed since such layers must necessarily be relatively thin in dimension. Because of the thinness of such layers, the same possess a very slight degree of solidity in the pre-pressed state and crumble even at light manual touch where the thickness of such layers is less than 1 mm. On the other hand, it is not possible to prepare single layers formed and stiffened or rigidified by sintering and hot pressing techniques, and to combine these layers by subsequent sintering or other hot pressing steps to form the multiple-layer electrode body, since the already formed and flattened surfaces of the single thin layers cannot indent into one another to enmesh the particles of one layer with the particles of the layer in abutment therewith to the extent necessary for mechanical solidity of the entire composite electrode body.

It is an object of the present invention to overcome the foregoing drawbacks and to provide for the production of multiple layer gas diffusion electrode structures by pressing and sintering together at least two abutting initially discrete metal powder layers, at least one of the layers initially being in the form of a solid heat-labile temporary thin flat structure.

It is another object of the present invention to simplify the production of multiple layer electrodes, especially those having large electrode layer areas by utilizing a series of practical and efficient steps which lend themselves to continuous and automatic production operations.

Other and further objects of the present invention will become apparent from a study of the within specification and accompanying drawing in which a graph is illustrated showing the more efficient performance of an electrode prepared in accordance with the invention in comparison to a known type of electrode.

It has been found in accordance with the present invention that a process for the production of a multiple layer gas diffusion electrode structure may be provided which comprises pressing and sintering together at least two abutting initially discrete metal powder layers to fuse the individual metal powder particles of each layer together and to fuse the particles of one layer with the particles of the adjacent layer at the points of contact between the particles, at least one of the layers initially being in the form of a solid heat labile, i.e. heat-changeable temporary thin flat structure with the metal powder particles thereof being maintained in fixed disposition by a heat-labile, i.e. heat-changeable or heat-decomposable binder material. The layers pressed and sintered in the foregoing manner may be recovered as a composite multiple layer electrode structure substantially free from the binder material with the particles fused to one another throughout the electrode structure. Preferably, the binder material may include a heat labile adhesive. Moreover, the binder material may include additionally, in accordance with a preferred feature of the invention, a flat surface auxiliary backing containing said metal powder particles thereon in fixed disposition in adherence therewith by means of the adhesive agent.

The flat surface auxiliary backing may comprise a heat labile material itself, such as paper, or in accordance with another embodiment; such backing may take the form of a metal plate, which upon sintering may be removed from the electrode structure.

It is preferred to provide the temporary thin flat structure with a predetermined shape corresponding to the shape of the metal powder layer thereof in the electrode structure to be formed. In this way a minimum effort is expended and the precise congruent shape of the electrode structure will be assured.

The pressing and sintering may be carried out separately or simultaneously, as will be appreciated by the artisan, the pressing taking place at a pressure between about 500 and 7,000 kilograms per square centimeter and the sintering taking place either at the same time as the pressing or subsequently thereto at a temperature between about 100 and 1100° C.

The particle magnitude of the metal powder layer of the temporary flat structure is preferably between about 5 and 100 microns.

The particle material used for the layer of the temporary thin flat structure and the other layer preferably contains a metal selected from the group consisting of the first and eighth groups of the Periodic Table of Elements. The metal of the layer of said temporary thin flat structure in accordance with one feature of the invention may be in the form of a carbonyl metal.

The multiple layer gas diffusion electrode prepared in accordance with the invention may contain a surface layer facing the electrolyte and a working layer facing the gas space of a fuel cell or other electro-chemical device, such electrode serving as partition wall between the electrolyte space and the gas space, or the electrode may be formed with a central working layer and an outer surface layer completely enclosing the working layer therewithin. In the latter instance, the electrode body may be formed by pressing and sintering three separate layers including two outer surface layers and a central or intermediate working layer, with the exposed layer sides of the intermediate layer being enclosed within a frame layer of similar make up as the surface layer, or the like.

Significantly, in accordance with a preferred embodiment of the invention, the surface layer or layers and the intermediate working layer should be made of powder materials whereby at least the intermediate working layer should be made of catalytically active material. The surface layer should cover the active working layer at least to the extent that ion communication with the working layer in the electrolyte is possibly only through the pores of the surface layer. In this connection, the pores of the surface layer may have an average pore radius, for example, within the range of from 0.1–100 microns.

The catalytically active working layer preferably contains a metal selected from the group consisting of silver, nickel, platinum, palladium, and also copper, iron, cobalt, ruthenium, rhodium, etc. in Raney form. Generally, the Raney metals used as active components of the Raney metal alloy may include metals from Group VIII as well as the first, VI and VII sub-groups of the Periodic Table, i.e. copper, silver, gold, chronium, molybdenum, tungsten, manganese, rhenium, iron, cobalt, nickel, ruthenium, rhodium, palladium, osmium, iridium, and platinum. Palladized charcoal may also be a component of a catalytically active layer.

The Raney alloy may be used together with a carrier substance sufficient to form a sinterable powder mixture. Aluminum, magnesium, silicon, and/or zinc may be used as the inactive alloying metallic component with the particular Raney metal chosen, such that upon leaching treatment with caustic solution, such as 6 N potassium hydroxide, the inactive component is dissolved away, leaving a Raney metal double skeleton catalyst electrode structure on the carrier material portion. The production of double skeleton catalyst electrode structures is well known and may be carried out in accordance with the procedure disclosed in U.S. Patent 2,928,891.

The particle size of the Raney alloy material is generally below 100 microns and may range between 1 and 400 microns, although in some cases where fine and uniform pores are necessary, it is preferred to use a particle range of from about 5 to 8 microns. The pore size, of course, will depend upon the molding pressure, sintering temperature, particle size, and physical properties of the electrode material in question, and an average pore radius of 1 to 10 microns for the working layer, and 0.2 to 1 micron for the surface layer have been found to be advantageous. The particle size for the supporting skeleton material used with the Raney alloy material for forming a double skeleton catalyst electrode structure may range between 1 and 50 microns, such material being an electrically conductive and catalytically inactive material, such as a carbonyl metal. Where the surface layer is to be catalytically inactive, the same may also be made from a carbonyl metal.

More specifically, the carrier material for the Raney alloy which serves as the electrically conductive skeleton is preferably composed of carbonyl nickel or carbonyl iron within the aforementioned particle range sizes, the carrier powder amounting to 90–20% by weight of the entire sinterable powder mixture while the Raney alloy portion amounts to from 10 to 80% by weight thereof. With respect to the Rney alloy itself, 20–80% by weight thereof, and preferably 40–60%, is represented by the Raney metal active component, while 80–20% by weight, and preferably 60–40% is represented by the inactive alloy component which is to be leached out by the subsequent activation treatment.

Electrodes of the forgoing kind may be used very well in electrolytes having a concentration of from 1–10 mols per liter, and preferably a potassium hydroxide solution of about 6 N concentration. Of course, where the surface layer is composed of catalytically inactive material, such material must be resistant to the action of the particular electrolyte used, yet be electrically conductive and sinterable so as to form a sure connection with the underlying catalytically active working layer.

With respect to the solid heat-labile temporary thin flat structure, the same may be formed by spreading onto a support surface a thin layer of a mixture of the metal powder particles and a solution of a heat-labile binder material in an inert volatilizable solvent, and then drying the mixture to form a heat-labile temporary thin flat structure of the binder material with the metal powder particles as a consequence of the evaporation of the volatilizable solvent therefrom. The support surface may be a paper backing for the temporary thin, flat structure or a metal plate backing which is removed subsequently to the sintering step. Advantageously, the temporary thin, flat structure may be formed as a continuous strip and individual thin, flat structures of predetermined shape corresponding to the shape of the metal powder layers thereof in the electrode structure to be formed may be cut from the continuous strip. The binder material may be a resin-containing lacquer such as a lacquer having acetone as solvent component. The binder material may also be a glue, such as a water-soluble paper glue or tapestry glue.

Therefore, in accordance with a preferred embodiment of the invention, the present invention contemplates a process for the production of a multiple layer gas diffusion electrode structure in which a set of three abutting initially discrete metal powder layers positioned one upon the next is pressed and sintered together to fuse the individual metal powder particles of each layer together and to fuse the particles of one layer with the particles of the next adjacent layer at the points of contact between the particles, using a pressing force between about 500 and 7,000 kg./cm.$^2$ and a sintering temperature of between about 100 and 1100° C., with at least two of the layers initially being in the form of a solid-heat labile temporary thin, flat structure having the metal powder particles thereof maintained in fixed disposition by a heat-labile binder material composed of a heat-labile resin adhesive. Upon sintering, the layers may be recovered as a porous composite multiple layer electrode structure substantially free from the binder material with the particles fused to one another throughout the electrode structure. Preferably, the average particle size of the metal powder particles of the intermediate layer of the three abutting layers is larger than the average particle size of the remaining outer layers, with each of the three layers containing a metal selected from the group consisting of the first and eighth groups of the Periodic Table of Elements. At least the intermediate layer is to be made from a powder mixture of 10–80% by weight of Raney alloy, and 90–20% by weight of electrically conductive supporting skeleton material, the Raney alloy including 20–80% by weight of inactive alloy component selected from the group consisting of aluminum, zinc, and magnesium. In particular, it is important to provide the average pore radius of the sintered outer layers smaller than the average pore radius of the sintered intermediate layer at any point and greater than 0 in at least a part thereof so that the electrolyte may enter the outer layers, yet be prevented from entering the intermediate layer due to the increase of the pore radius of such intermediate layer. Of course, each of the three layers may be initially in the form of a solid heat-labile temporary thin, flat structure, or the two outer layers may be so formed while the intermediate layer is initially in the form of a loose metal powder particle layer disposed between the outer layers. An additional set of three abutting layers of initially discrete metal powder layers disposed one above the other may be included, in accordance with a further embodiment of the invention, in the same pressing and sintering operation as the first-mentioned set of three abutting layers. In this connection, the two sets may be disposed in stacked abutting disposition while the same are separated by an intervening backing plate therebetween to render easy separation of the two composite electrode structures thereby formed upon termination of the sintering operation.

The present invention, therefore, provides for the production of multiple layer gas diffusion electrodes starting from metal powder materials suspended in liquids to form the temporary thin, flat structure upon evaporation of the liquid portion. In this regard, a heat-labile binder material is used which may take the form of a solution of a glue, an adhesive, or a varnish binding agent from which the solvent evaporates under suitable conditions to form the temporary thin, flat structure in question. A band, foil, or plate-like body results from the solvent evaporation and the particular structure obtained may be superposed in ordinal sequence with other individual layers of electrode material in the compression molding and sintering operations. The binding agents used are included in such quantities in admixture with the metal powder particles that upon evaporation of the solvent or after artificial or accelerated aging of the binding substance, a tough plastic or solid consistency results to a degree sufficient to maintain the metal powder particles in fixed disposition in the form of a thin, flat structure. It will be appreciated that the layers formed include per square centimeter as much metal powder material as will be required in the corresponding layer of the gas diffusion electrode to be formed therewith.

The individual temporary thin, flat structures may be formed advantageously into a continuous band or strip for convenient storage on rolls or spools, so that before compression molding and sintering, the individual layers therefor may be blanked and cut out from the preformed band or strip in a configuration and size corresponding to that desired in the electrode body to be formed. Such configuration and size will preferably correspond with the cross-sectional shape of the mold, allowing for suitable tolerances. Nevertheless, it is also possible to preform directly the plate-shaped bodies for the individual layers in the corresponding configuration and size, so that blanking and cutting out of the individual layers may be omitted. For this purpose, the plate-shaped bodies are superposed in the mold in the ordinal sequence of the layers desired in the electrode structure, whereupon such layers may be pressed and sintered in the desired manner. Since the external surface layers of the electrode should be as thin as possible, it is most desirable to apply the metal powder material suspended in the liquid binding agent onto a carrier foil, such as paper, whereby the thin bodies formed upon evaporation of the solvent may be placed in abutting engagement with the bodies representing the other layers in the electrode for compressing and sintering operation, so long as the carrier foil is disposed on the outside surface of the electrode body. Accordingly, the carrier foil which is conveniently converted into ash or carbon by the pressing and sintering operations may be mechanically removed from the composite electrode structure by abrasion or attrition. For example, the sintered electrode structures may be brushed to free the outer surfaces thereof from adhering ash or carbon. Where metal plates are used as carriers or auxiliary backing means, such metal plates may be readily separated upon sintering by prying the same away from the now formed composite electrode structure.

It will be appreciated from the foregoing that the present invention is advantageously suitable for the simultaneous preparation of a plural number of electrodes in the same mold since the introduction of the layers of material into the mold no longer causes the former difficulties of crumbling of thin layers of powder materials which have not yet been sintered. All types of gas diffusion electrodes may be produced in accordance with the invention, and it is sufficient merely to form the materials for the two outer surface layers of the electrode body in the form of temporary thin, flat structures, while the material for the intermediate layer or layers may be incorporated in loose form between the two surface layers.

While the particular binding agents to be selected in accordance with the invention will depend upon the materials to be fabricated and the manufacturing conditions, especially the temperatures used, it is necessary only for the binding agents to possess sufficient mechanical stability n the preformed temporary thin, flat structure to permit the introduction of the same into the mold without crumbling or breaking up. Adhesives which decompose at 50° C. are most desirable since the same are useable in accordance with the invention at all temperatures above 50° C., so that the sintering step will decompose the binding agent, leaving only the metal particles of the different layers in fused contact with one another. Naturally, if a particular sintering temperature is required, any binding agent may be used for the temporary thin, flat structure which will evaporate or decompose at or below such temperature. In this regard, it has been found that practically all binding agents consisting of organic substances which are unstable above 250° C. may be used in accordance with the invention. The solvent which is to be evaporated at or after the formation of the thin, flat structure may be selected in dependence upon the adhesive agent used. Most of the binding agents in accordance with the invention are soluble in benzene, some are soluble in carbon tetrachloride, many in alcohols, etc. Furthermore, numerous water-soluble glues may be used, such as tapestry glues, and paper glues.

In general, the adhesive or binding agents contemplated are not decomposed by the metal powders, and accordingly, the binding agents may be said to be inert with respect to the metal particles employed. Polymeric binding agents or adhesives find particular application in accordance with the invention, except for those which contain peroxides, since the latter materials have an adverse effect on silver. Suitable adhesives are enumerated f.i. in "Chemie-Lexikon," by H. Römpp, Franck'sche Verlagsbuchhandlung, Stuttgart, Germany, 4. Ausgabe 1958, columns 2292–2299, 2301–2302, 2518–525, and 2578–2580. The percentage of weight of the adhesives, regarding to the metal powder, ranges preferably from 1 to 3%. It may also be higher without causing any damage, which would, however, render the process more expensive.

The following examples are set forth for the purpose of illustrating the present invention. The examples demonstrate a process for a quick production of electrodes without defective goods. It will be understood that the invention is not to be limited to these examples.

Example 1

In order to form a 2-layer gas diffusion electrode structure having a catalytically inactive surface layer and a catalytically active working layer, the following procedure is used:

*Layer 1.*—Carbonyl nickel powder with an average diameter smaller than 5 microns is suspended in Zapon-varnish-acetone solution (Zapon being a registered trademark of Atlas Powder Company covering air-drying metal lacquer enamel, i.e. nitrocellulose coating containing hard gum and alkyd resin), and the resulting mixture is applied onto a highly polished metal plate of the type used for drying photographic paper. A layer is applied having a thickness corresponding to 0.3 gram per square centimeter of the metal powder. Upon evaporation of the solvent, the layer is drawn off from the metal plate in the form of a temporary thin, flat structure and two small circular discs having a diameter of 40 mm. are blanked out and separated from the thin, flat structure.

*Layer 2.*—In the same way, a powder mixture of 1.6 parts by weight of carbonyl nickel powder and 1 part by weight of powdered Raney nickel alloy with a diameter between 35 and 50 microns, consisting of aluminum and nickel in a ratio of 50% by weight of each component, is formed into a layer with a thickness corresponding to gram per square centimeter. A circular disc of the same diameter as that of layer 1 is blanked out and cut from the layer so-formed and this disc is placed between the two layer 1 discs and pressed together therewith in a mold under a pressing force of 4 tons per square centimeter. The pressed composite object which results is subsequently sintered in a hydrogen current for a period of 30 minutes at a temperature of 650° C. After activating the composite electrode body formed in this manner, by removing the aluminum from the Raney alloy portion through treatment with 6N potassium hydroxide, the electrode is operated successfully as hydrogen electrode in a fuel cell.

Example 2

In accordance with the teaching of Example 1, the same type of layer 1 as that of Example 1 is spread upon a thin transparent paper sheet such that the layer which forms has a thickness corresponding to 0.2 gram per square centimeter only. The layer adheres to the paper upon evaporating the acetone solvent and two discs having a diameter of 40 mm. are blanked out and separated from the paper-backed layer. One of the discs is imbedded in a mold, and thereafter 15 grams of Raney alloy powder material of the same type as used in Example 1 are introduced into the mold as layer 2, such material being spread upon and flattened against the first disc. Finally, the second disc is introduced over layer 2 so as to form layer 3. The paper backing on each of the discs is on the disc face remote from the intermediate layer 2. After slightly pressing the three layers superposed upon one another in abutting relation, using a pressing force of 0.2 ton per square centimeter, the electrode body formed is stiffened and made rigid by sintering for about 1 minute at a temperature of 350° C. under a compression force of 1.5 tons per square centimeter. Thereafter, the three layers cohere very well to one another with the points of contact between the respective layers being fused together, and the charred paper remaining on the outer sides of the electrode body is easily wiped off. After leaching the aluminum content from the Raney alloy by subjecting the electrode body to the action of caustic alkali in the same manner as in Example 1, the composite electrode structure is activated in such a way that hydrogen gas may be supplied to the intermediate layer from an external source, so that with the electrode immersed in an electrolyte excellent anodic current densities are attainable at a pressure of 1 atmosphere excess pressure. The electrode intermediate layer is entirely filled with the hydrogen fuel gas while the outer layers are filled with the electrolyte only as far as the separating zone between the two layers.

In accordance with the graph of the accompanying drawing, it will be seen that using such electrode a current density/polarization characteristic is obtained in accordance with the invention (curve 1) which is somewhat more favorable than that obtained with a similar electrode (curve 2) in which the respective electrode layers are introduced into the mold in the form of loose powder layers in successive order in accordance with the usual method. The same mold is used for producing both electrodes under otherwise equal conditions, save for the preforming of the individual layers in accordance with the invention. The usual zone of dispersion only can be obtained with an electrode produced in accordance with conventional techniques, whereas high capacity electrodes may be obtained in mass production using the process of the invention.

As may be seen from the accompanying graph, operating the electrode of the invention and that prepared in accordance with the usual technique at 25° C. in a fuel cell containing potassium hydroxide having a concentration of 4.5 N, with a hydrogen gas pressure of 1.3 atmospheres excess pressure, the measure of the potential in millivolts (mv.) referred to the potential of a saturated calomel electrode, is plotted against the anodic current strength measured in amperes (a.) as well as the anodic current density measured in milliamperes per square centimeter (ma./cm.$^2$). The total area of the electrode surface as represented by the outer layer discs is 25 square centimeters for each electrode.

Example 3

In accordance with the procedure of the foregoing examples, a plurality of layers may be formed into a composite electrode using metal plate backed layers rather than those backed with paper. For this purpose 6 discs having a diameter of 40 mm. are blanked out and separated from an iron plate having a thickness of 0.5 mm. These discs are polished and thereafter slightly oxidized by heating in air. Subsequently, each disc is spread with the metal powder material for layer 1 on one side of each disc, such powder material corresponding to that used in Example 1. The thickness of the layer spread upon the disc in each case corresponds to 0.2 grams per square centimeter of the metal powder material. One of the discs is placed into the mold with the iron plate side downward, and thereafter 15 grams of loose powder material of the same type as used in Example 1 are introduced to form layer 2, such material being spread and flattened in place. Thereafter, a second disc containing a layer corresponding to layer 1 is pressed against the loose material of layer 2, such that the disc faces outwardly. A third disc having layer 1 material thereon is then placed upon the last-mentioned disc with the layer material upwardly facing and another layer of loose material for forming layer 2 of the second set is spread, followed by a fourth disc with the layer 1 material facing downwardly against the loose material of layer 2. The procedure is repeated once more until the necessary layer material and discs for three sets of layers for forming three composite electrodes is in place in the mold. The electrode sets are stiffened under a pressing force of 1.6 tons per square centimeter at a temperature of 320° C. for 90 seconds and upon recovery exhibit an excellent mechanical rigidity and ruggedness. The discs may be removed from the external sides of the composite electrode layers without difficulty by merely prying the discs off. The electrodes produced in this manner have the same electro-chemical properties as those described in Example 2 and the iron discs employed as auxiliary backing exhibited no damaged or deformation in any way, with the consequence that such discs are reuseable over and over again. This example illustrates that a plurality of sets of layers 1 and 2 may be prepared simultaneously, with the separate composite electrodes produced being readily recovered from one another. The filling of the separate layers into the mold required little care and proceeded very quickly with a minimum of effort.

In accordance with the procedure of Example 3, a composite electrode is prepared using an auxiliary backing of brass rather than iron. In this instance, a sheet of brass is provided with a layer of metal particle material and binding agent of the type indicated in Example 1, and upon evaporation of the solvent, two discs having a diameter of 40 mm. are blanked out and separated from the brass sheet employed. The metal material and binder on the brass discs represent material for the outer layer 1 on each side of the intermediate layer 2. For each of the brass discs about 5 grams of the metal material for the layer 1 were used, the powder having been uniformly sieved. The binder material upon evaporation of the acetone therefrom was sufficient to render the particle layer securely attached to the brass disc. One of the brass discs is then placed in the pressing mold with the brass disc facing downwardly, and thereafter 10 grams of the powder material for the gas conducting layer 2 are filled into the mold on top of the first layer 1 and flattened thereat. The powder material for the layer 2 consists of 2 parts by weight of carbonyl nickel with a particle size of 4 to 5 microns and 1 part by weight of potassium chloride, such material having a grain size of between 200 and 400 microns. Thereupon, the second brass disc with the accompanying layer 1 coating facing downwardly is placed upon the powder material of layer 2 and the mold stamp urged against the layers in the mold. The pressing force used is 1.5 tons per square centimeter and the pressing was carried out for 75 seconds at a temperature of 340° C. After pressing, the brass discs are easily loosened from the pressed and sintered object. During the activation of the Raney alloy also the potassium chloride is dissolved. In the same way, as in Example 3, the electrode formed is at least of the same order of effect as a similar electrode produced in accordance with the wearisome usual method, with respect to the electrochemical properties of the electrode as a hydrogen electrode in a fuel cell.

The foregoing examples may be repeated using each of the following materials as metal powder particles for the surface layer, i.e., layer 1: carbonyl nickel, carbonyl iron, electrolytic copper, molecular silver, and mixtures of these materials as for instance with Raney alloy powders of the systems aluminum/nickel, aluminum/copper, aluminum/silver, aluminum/iron, aluminum/palladium, and aluminum/molybdenum. Of course, other Raney alloys may be used in admixture with the first-mentioned metal materials, especially those in which the Raney alloy contains zinc or magnesium in place of the aluminum as inactive alloy component. Generally, all Raney alloys may be used in admixture with one another. The surface layer, i.e. layer 1 or outer layer, may be composed of only carbonyl nickel, carbonyl iron, electrolytic copper, molecular silver, and mixtures thereof without any Raney alloy material, if desired, such as where the surface layer is to be catalytically inactive.

On the other hand, the intermediate layer, i.e. layer 2 may be composed of any known Raney alloy whereby the active Raney component, after eliminating the inactive alloying component, occupies the catalytically active working layer thereby formed.

What is claimed is:

1. Process for the production of a porous multiple layer gas diffusion electrode structure, which comprises pressing together, at between about 1000 and 7000 kg./cm.$^2$, and then sintering, at between about 100 and 1100° C., at least two abutting initially discrete metal powder layers to fuse the individual metal powder particles of each layer together and to fuse the particles of one layer with the particles of the adjacent layer, such fusion taking place substantially only at the points of contact between the particles, at least one of the layers initially being in the form of a solid temporary thin flat structure with the metal powder particles thereof being maintained in fixed disposition by a heat-decomposable binder material, and recovering the layers as a composite porous multiple layer electrode structure substantially free from the binder material, with the particles fused to one another throughout the electrode structure.

2. Process for the production of a porous multiple layer gas diffusion electrode structure, which comprises pressing and sintering together a set of three abutting initially discrete metal powder layers positioned one upon the next to fuse the individual metal powder particles of each layer together and to fuse the particles of one layer with the particles of the next adjacent layer, such fusion taking place substantially only at the point of contact between the particles, using a pressing force of between about 500 and 7000 kg./cm.$^2$ and a sintering temperature of between about 100 and 1100° C., at least two of the layers initially being in the form of a solid temporary thin flat structure with the metal powder particles thereof being maintained in fixed disposition by a solid binder material composed of a heat-decomposable resin adhesive, and upon sintering recovering the layers as a porous composite multiple layer electrode structure substantially free from the binder material, with the particles fused to one another throughout the electrode structure, the average particle size of the metal powder particles of the intermediate layer of said three abutting layers being larger than the average particle size of the remaining outer layers, each of said three layers containing a metal selected from the group consisting of the first and eighth groups of the Periodic Table of Elements, at least said intermediate layer being made from a powder mixture of 10 to 80% by weight of Raney alloy and 90 to 20% by weight of electrically conductive supporting skeleton material, said Raney alloy including 20 to 80% by weight of Raney metal active component and 80 to 20% of inactive alloy component selected from the group consisting of aluminum, zinc, and magnesium, the average pore radius of the sintered outer layers being smaller than the average pore radius of the sintered intermediate layer at any point and greater than zero in at least a part thereof.

3. Process according to claim 2 wherein each of the three layers is initially in the form of a solid temporary thin flat structure.

4. Process according to claim 2 wherein each of the two outer layers is initially in the form of a solid temporary thin flat structure, the intermediate layer initially being in the form of a loose metal powder particle layer disposed between said outer layers.

5. Process according to claim 4 wherein each said outer layer is provided on a flat outer surface auxiliary backing plate with said metal powder particles in fixed disposition thereon in adherence therewith, said backing plate having a predetermined shape corresponding to the shape of the metal powder layer thereof in the electrode structure to be formed.

6. Process according to claim 2 wherein the intermediate layer is composed of a mixture of about 1.6 parts carbonyl nickel powder and about 1 part powdered Raney nickel alloy containing ½ part nickel and ½ part aluminum, and the outer layers are composed of a mixture of carbonyl nickel powder and varnish from which acetone solvent has been evaporated, the pressing being carried out separately at a pressing force of about 4 tons/cm.$^2$ and the sintering thereafter at a temperature of about 550° C. for about 30 minutes in a hydrogen current, the pressed and sintered composite electrode structure subsequently being activated to remove the aluminum content therefrom by treatment with caustic alkali.

7. Process according to claim 2 wherein an additional set of three abutting layers of initially discrete metal powder layers positioned one upon the next are included, said additional set being disposed in stacked abutting disposition with the other set, said sets being separated by an intervening backing plate therebetween.

8. Process for the production of a porous multiple layer gas diffusion electrode structure which comprises pressing together, at between about 1,000 and 7000 kg./cm.$^2$, and simultaneously sintering, at between about 100 and 1100° C., at least two abutting initially discrete metal powder layers to fuse the indivdual metal powder particles of each layer together and to fuse the particles of one layer with the particles of the adjacent layer, such fusion taking place substantially only at the points of contact between the particles, at least one of the layers initially being in the form of a solid temporary thin flat structure with the metal powder particles thereof being maintained in fixed disposition by a heat decomposable binder material, and recovering the layers as a composite porous multiple layer electrode structure substantially free from the binder material, with the particles fused to one another throughout the electrode structure.

References Cited by the Examiner

UNITED STATES PATENTS

| | | | |
|---|---|---|---|
| 2,368,458 | 1/1945 | Engle | 75—204 |
| 2,390,160 | 12/1945 | Marvin | 75—222 X |
| 2,491,284 | 12/1949 | Sears | 75—208 |
| 2,557,372 | 6/1951 | Cerulli et al. | 75—208 |
| 2,675,418 | 4/1954 | Nichols | 75—208 |
| 2,681,375 | 6/1954 | Vogt | 75—208 |
| 2,792,302 | 5/1957 | Mott | 75—222 X |
| 2,986,671 | 5/1961 | Kerstetter et al. | 75—208 |
| 3,028,656 | 4/1962 | Herbert | 75—208 |
| 3,073,697 | 1/1963 | Friese et al. | 29—182.2 |

FOREIGN PATENTS 369,964  3/1932  Great Britain.

OTHER REFERENCES

Goetzel: Treatise on Powder Metallurgy, Interscience Publishers, Inc., New York, vol. I, (1949), pages 251–253, vol. II (1950), pages 231–232.

Jones: "Fundamental Principles of Powder Metallurgy," Edward Arnold Publishers Ltd., London, 1960, pages 382–385.

REUBEN EPSTEIN, *Primary Examiner.*

CARL D. QUARFORTH, *Examiner.*